United States Patent [19]

Grisel et al.

[11] Patent Number: 4,627,746
[45] Date of Patent: Dec. 9, 1986

[54] HYDRO-DYNAMIC FLUID BEARING COMPRISING BEARING MEMBERS SUBJECT TO PROGRESSIVE PRE-LOADING

[75] Inventors: Charles H. Grisel, Bezons; Henri Hus, Igny, both of France

[73] Assignee: Hispano-Suiza, Saint-Cloud, France

[21] Appl. No.: 805,747

[22] Filed: Dec. 6, 1985

[30] Foreign Application Priority Data

Dec. 6, 1984 [FR] France ............................... 84 18592

[51] Int. Cl.[4] ............................................ F16C 32/06
[52] U.S. Cl. ..................................... 384/99; 384/117; 384/119
[58] Field of Search ................ 384/99, 119, 117, 309, 384/114, 122

[56] References Cited

U.S. PATENT DOCUMENTS

| 3,899,224 | 8/1975 | Schuller et al. | 384/119 |
| 4,025,130 | 5/1977 | Streifert | 384/117 |
| 4,422,779 | 12/1983 | Hamaekers et al. | 384/99 |
| 4,544,285 | 10/1985 | Shapiro et al. | 384/99 |

FOREIGN PATENT DOCUMENTS

| 1354199 | 1/1963 | France . |
| 2116141 | 7/1972 | France . |
| 2133373 | 11/1972 | France . |
| 2528135 | 9/1983 | France . |

*Primary Examiner*—Lenard A. Footland
*Attorney, Agent, or Firm*—Oblon, Fisher, Spivak, McClelland & Maier

[57] ABSTRACT

A hydro-dynamic fluid-bearing assembly constituted by bearing members disposed around a rotary shaft with the interposition of a film of pressure fluid. At least one of the bearing members is subject when the shaft is stopped to the action of a resilient member generating a limited pre-loading strictly necessary for maintaining the assembly in its correct interrelationship, the said resilient means being subject during operation of the shaft to the action of pressure fluid bled from the film of fluid under pressure lying beneath the bearing member and such that the load on the bearing member increases with the pressure of the fluid film.

8 Claims, 6 Drawing Figures

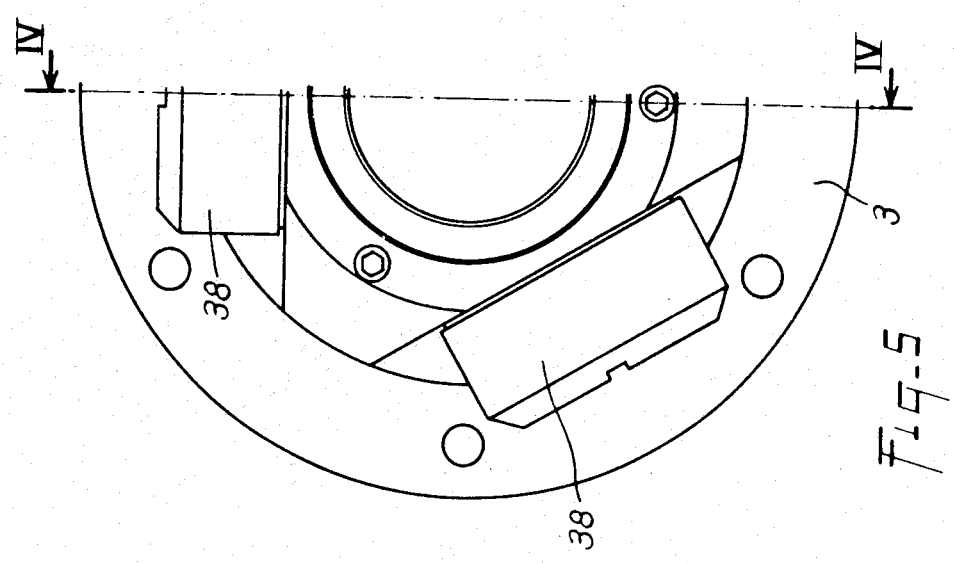
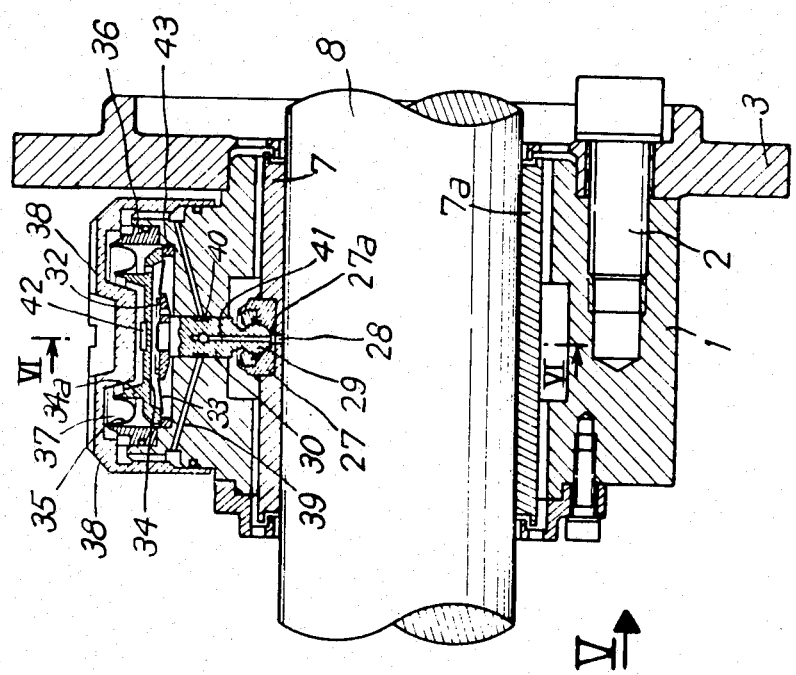

HYDRO-DYNAMIC FLUID BEARING COMPRISING BEARING MEMBERS SUBJECT TO PROGRESSIVE PRE-LOADING

BACKGROUND OF THE INVENTION

1. Field of the Invention

The present invention relates to a hydro-dynamic fluid bearing comprising bearing members subject to progressive pre-loading as the rotational speed of an associated shaft increases.

2. Summary of the Prior Art

Hydro-dynamic bearing assemblies are known of which the bearing members are subject to a constant pre-load or the hydrostatic bearing members of which the load can be adjusted. FR-A 2 116 141 relates to a hydrostatic bearing of the latter type according to which when stationary and at low speeds a light pre-load is produced solely by a spring while, when the rotational speed increases, the loading on the bearing member is automatically increased by means of an external fluid. In contrast, in accordance with the present invention, a hydro-dynamic bearing includes provision for progressive loading of the bearing members by making use of fluid under pressure bled from the fluid film lying beneath the bearing member itself. In practice, when the shaft reaches high speed rotation, it entrains the fluid which is interposed between the bearing members and the shaft, thus forming a lubricating film. Further, in accordance with the present invention, at least one of the bearing members is subject when the shaft is stopped to the action of a resilient member producing a pre-load limited strictly to that which is necessary for maintaining the assembly parts in correct relationship, the said resilient means being subject during operation of the shaft to the action of pressure fluid bled from the fluid film under pressure lying beneath the bearing member and so that the load on the bearing member increases with the pressure of the fluid film.

SUMMARY OF THE INVENTION

According to the present invention there is provided in a hydro-dynamic fluid bearing assembly a rotary shaft, bearing members disposed around the rotary shaft with the interposition, in operation, of a pressure fluid film, a bearing housing for said members, a resilient member acting, when the shaft is stationary, on one of the bearing members, so as to produce a limited pre-load on that member, and means, operable during use of the assembly, to subject the said resilient means to the action of pressure fluid bled from the film of pressure fluid lying beneath the bearing member so that the loading on the bearing member increases with the pressure of the fluid film as the rotational speed of the shaft increases.

BRIEF DESCRIPTION OF THE DRAWINGS

FIG. 4 is an axial section of another embodiment of a hydro-dynamic bearing on the line IV—IV of FIG. 5;

FIG. 6 is a longitudinal section on the line VI—VI of FIG. 4.

DESCRIPTION OF THE PREFERRED EMBODIMENTS

Figure 2:
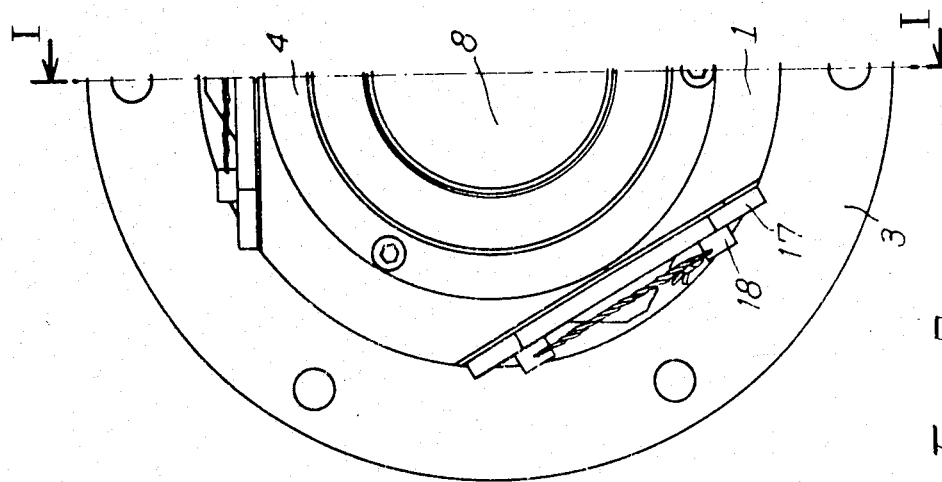
FIG. 2 is one half of an end view of the bearing assembly in the direction of the arrow II of FIG. 1.
Figure 1:
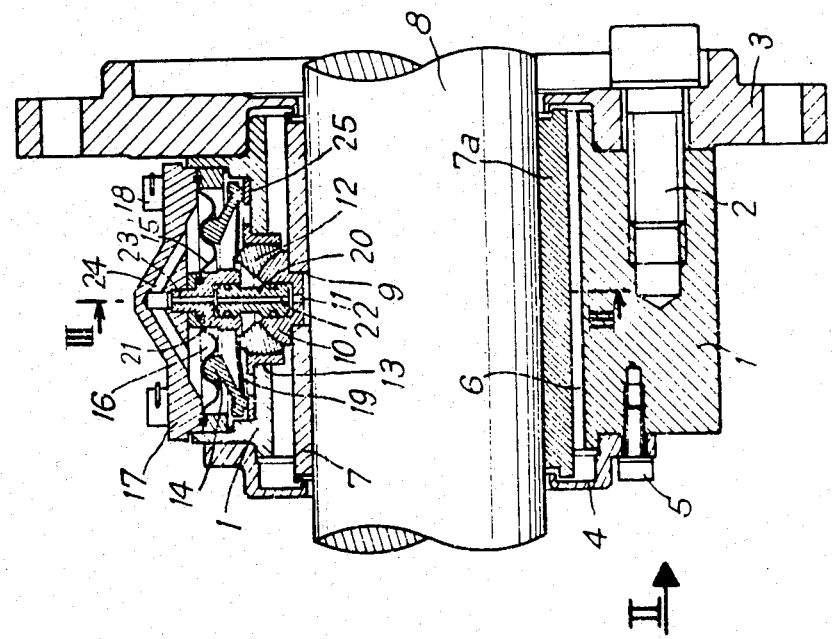
FIG. 1 is a sectional view of one embodiment of a hydro-dynamic bearing according to the invention on the line I—I of FIG. 2.
Figure 3:
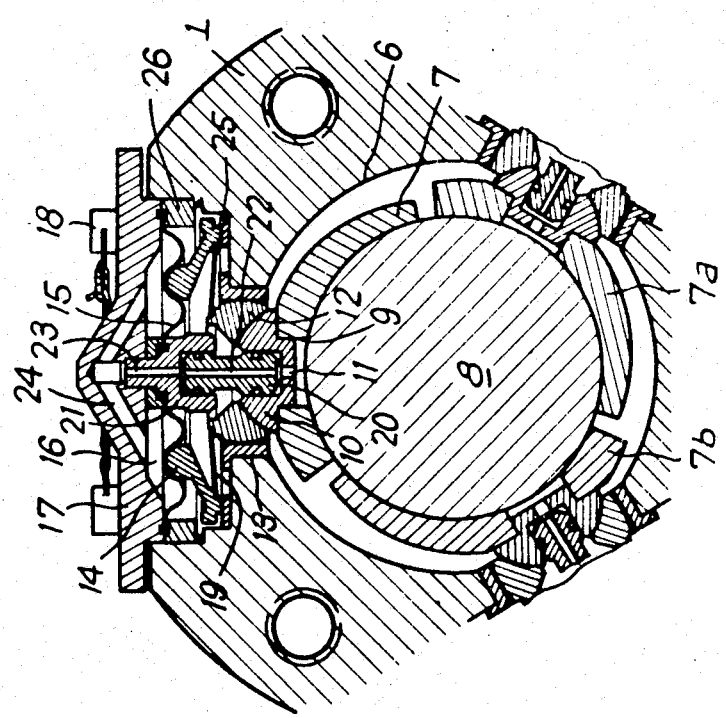
FIG. 3 is a cross-section of the bearing assembly on the line III—III of FIG. 1.

A hydro-dynamic bearing assembly is illustrated in FIGS. 1, 2 and 3 which comprises a housing 1 secured at one of its ends by means of bolts 2 onto a flange 3 of an associated engine or other machine and provided at its other end with a cover 4 secured by means of bolts 5 to the housing 1. The housing 1 has a bore 6 in which three bearing members 7,7a,7b are located which are in contact with the rotary shaft 8. One of the bearing members is, or the three bearing members 7,7a,7b are, provided with a progressive pre-load device in accordance with the invention but in order to facilitate understanding and for simplicity the description will be limited to one of the bearing members 7, and the associated device.

In order to enable operation of the device, the bearing member 7 has an opening 9 leading into the region of the maximum pressure field of the bearing member in order to bleed the pressure fluid lying between the rotating shaft 8 and the inner face of the bearing member 7. A member 10 of a form similar to that of a spherical or knuckle joint is mounted in the opening 9. This has a central passage 11 and another member 12 having a concave spherical surface of complementary form is itself slidably mounted in a ring 13 rigid with the housing 1 and the ring is engaged in a bore provided in the latter. The member 10 has a step acting as an abutment contacting a flat formed in the outer surface of bearing member 7. The outer surface of the member 12 is also spherical.

An annular member 14 displaceable within limits is mounted around the sliding member 12 and is subject to the action of a flexible membrane 15 defining one of the walls of a pressure fluid chamber 16 closed off, upwards as shown, by a circular cover 17 secured by a ring of bolts 18 extending into the housing 1 of the bearing assembly. For security the bolts are wired. A central part of the cover is conical with the apex extending upwardly (as shown in FIG. 1). The membrane 15 is a concentrically annularly corrugated member capable of transmitting forces.

A resilient diaphragm 19 is mounted between the member 12 and the annular member 14; the diaphragm engages a downwardly-directed peripheral ridge of the annular member 14 and a central internal periphery of the diaphragm engages an annular abutment of the annular member 12.

The member 10 has a recess in which is engaged one of the spherical parts of a spool-like connector 20 of which the other spherical end part is engaged in a recess of a head 21 mounted, in part, within the central part of the cover 17.

The connector 20 has a central passage 22 which communicates with a passage 23 provided in the head 21 and the passage 23 communicates with passages 24 provided in the cover 17 which, in turn, communicate with the pressure fluid chamber 16.

When the shaft 8 is stationary, only the resilient diaphragm 19 exerts a predetermined limited pre-loading which is strictly necessary for maintaining the parts of the assembly in correct relationship, the pre-loading being applied to the spherical members 12 and 11 which act on the corresponding bearing member 7.

When the shaft 8 rotates, it generates a fluid film under pressure between the shaft 8 and the bearing member 7, so that the fluid under pressure is bled from a region of maximum pressure through the opening 9 and the central passage 11, through the passage 22 of the connector 20, through the passage 23 of head 21 and through passages 24 to the pressure chamber 16.

The pressure fluid in the chamber 16 exerts pressure on the membrane 15 which acts through the intermediary of the annular member 14 on the resilient diaphragm which is deformed and transmits an equivalent pressure through the spherical members 12 and 11 to the bearing member 7. It follows that the load on the bearing member 7 increases with the pressure of the fluid film between the shaft 8 and the bearing member 7. The annular member 14 is displaced within limits of a clearance controlled both in amount and in location between two spacers 25 and 26 (FIG. 3).

Figure 5:
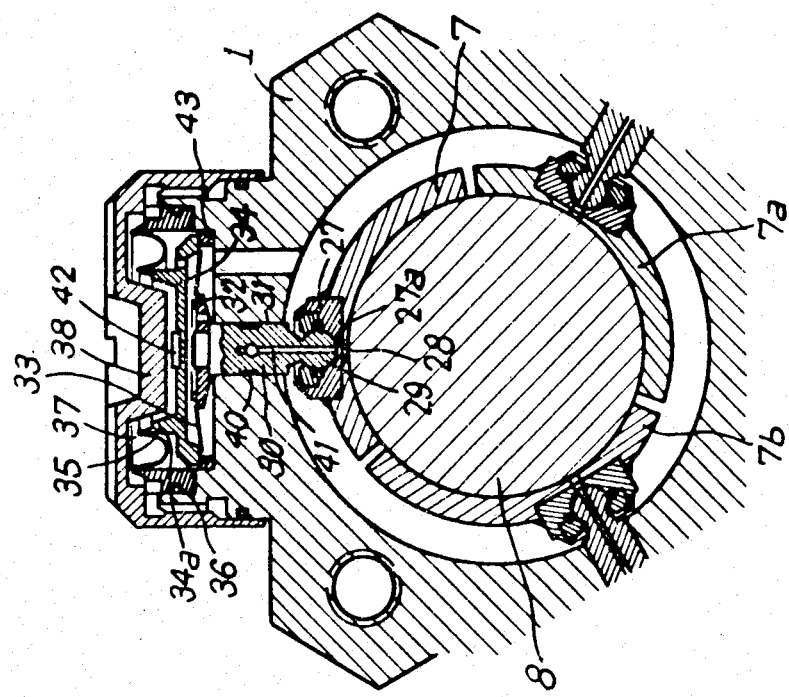
FIG. 5 is an end view of the second bearing assembly in the direction of the arrow V of FIG. 4.

FIGS. 4, 5 and 6 illustrate another embodiment of a hydro-dynamic bearing assembly and again it will be described with particular reference to the bearing member 7. The assembly comprises a connecting member 27 mounted on the bearing member 7 which has an orifice 28 opening into the region beneath the member of maximum pressure field.

The connecting member 27 has a spherical recess in which a spherical member 29 (similar to a knuckle joint) is mounted, formed over a part of its length as a piston 30 slidably mounted in a bore 31 (FIG. 6) of the housing 1 of the bearing assembly. A locking ring serves to secure the spherical member 29 in the recess.

At the upper end (as shown), the piston 30 is provided with a cap 32 in abutment with a central part of a resilient diaphragm 33 of which the peripheral edge engages a movable circular member 34 having an annular upstanding ridge 34a on which a flexible membrane 35 is mounted which is itself secured at its periphery to a ring 36 rigid with the housing 1 of the bearing assembly.

The movable member 34 and the membrane 35 form one of the walls of a pressure fluid chamber 37 closed off by a cover 38 screwed onto the housing of the bearing assembly. The chamber 37 is in communication with the orifice 28 of the bearing member through passages 39 provided in the housing 1, by way of a groove 40 and a central passage 41 provided in the piston 31 and by way of an orifice 27a in the member 27. Spacers 42 and 43 limit the displacement of the movable member 34 as in the first described embodiment.

When the shaft 8 is stationary, only the resilient diaphragm 33 exerts a pre-load on the bearing member 7 through the intermediary of the cap 32 of the piston 30 and of the abutment member 27.

When the shaft is rotating, the bleed of fluid under pressure from the fluid film is effected through the orifice 28, the passage 41, the groove 40 and passages 39 to the chamber 37.

The pressure fluid in the chamber 37 acts on the membrane 35 and the movable member 34 which causes the deformation of the resilient diaphragm 33. This deformation of the diaphragm 33 is converted to a pressure exerted on the piston 30 and thus on the bearing member 7. As in the first described embodiment, the load on the bearing member 7 increases progressively with the pressure of the fluid film between the shaft 8 and the bearing member 7.

It will be understood that the invention should not be considered to be limited to the specific embodiment hereinbefore described and the man skilled in the art will be able to apply modifications without departing from the scope of the invention.

What is claimed is:

1. In a hydro-dynamic fluid bearing assembly
   a rotary shaft,
   bearing members disposed around the rotary shaft with the interposition, in operation, of a pressure fluid film,
   a bearing housing for said members,
   a resilient member acting, when the shaft is stationary, on one of the bearing members, so as to produce a limited pre-load on that member, and
   means, operable during use of the assembly, to subject the said resilient means to the action of pressure fluid bled from the film of pressure fluid lying beneath the bearing member so that the loading on the bearing member increases with the pressure of the fluid film as the rotational speed of the shaft increases.

2. An assembly according to claim 1, wherein the said means includes means defining a chamber, including a deformable wall, said wall serving to generate forces in the resilient member which are applied to the bearing member.

3. An assembly according to claim 1, wherein the said means comprises means defining an opening whereby fluid is bled from beneath the bearing member at the zone of maximum pressure of the pressure fluid.

4. An assembly according to claim 1, wherein said bearing member has an opening,
   a member of part-spherical form having a part thereof engaged in said opening,
   a further member having a part-spherical concave surface engaging the part-spherical surface of the first member,
   a ring mounted in the housing of the bearing assembly and slidingly receiving the said further member,
   a resilient diaphragm engaging a central part of the further member,
   an annular, displaceable, member engaging the peripheral part of the diaphragm,
   a flexible membrane forming one of the walls of a pressure chamber itself forming a part of the said means to subject the resilient means to the action of pressure fluid,
   the means to subject the resilient means to the action of pressure fluid further including
   a spool-like connector with a passage therein and
   an orifice of one of the part-spherical members communicating with the space lying between the bearing member and the shaft.

5. An assembly according to claim 4, further comprising
   means defining a cover of the housing, and
   means defining a head member intermediate the cover and the spool-like connector, both the cover and the head member having intercommunicating passages therein and the head member having a recess,
   the spool-like connector having two spherical end parts of which one is engaged in a recess in that one of the part-spherical members mounted on the said bearing member and of which the other spherical part is engaged in the recess of the said head member mounted in the cover.

6. An assembly according to claim 1, wherein said means comprises an abutment member received in said one bearing member and having a spherical recess and a central passage,
- a part-spherical member engaged in the spherical recess and formed intermediate its ends as a piston having a central passage, means defining a bore in the housing and receiving the piston,
- a resilient diaphragm,
- a member displaceable within limits,
- an annular, flexible, membrane,
- a ring rigid with the housing,
- the periphery of the diaphragm engaging said displaceable member, an annular edge of the displaceable member being secured to the membrane, the periphery of the membrane being mounted to said ring, the said displaceable member and the flexible membrane forming one of the walls of a chamber in communication through at least one passage provided in the housing with the central passage provided in the piston and communicating through the orifice of the abutment member with an orifice provided within the said bearing member in communication with the fluid film.

7. An assembly according to claim 6, comprising spacers co-operating with the displaceable member, the displaceable member being subject to the action of the flexible membrane and being displaceable within a clearance limit controlled in value and location by said spacers.

8. In a hydro-dynamic bearing assembly
a rotary shaft,
bearing members arrayed around and in supporting relationship with the shaft through lubricating films,
a bearing housing accommodating the bearing members,
each said bearing member being subject to the action of
a pressure control device, said device comprising
- a resilient member permanently biasing the associated bearing member towards the shaft whereby to pre-load the bearing member even when the shaft is stationary, and
- means, operable only when the shaft is rotating, to subject the said resilient means to the action of pressure fluid bled from the said film of pressure fluid so that the loading on the bearing member increases with the pressure of the fluid film as the rotational speed of the shaft increases.

* * * * *